Oct. 13, 1925.

J. C. MURRAY 1,556,868

CONVERTIBLE ROLL FILM CAMERA

Filed Dec. 18, 1919   2 Sheets-Sheet 1

INVENTOR
John C. Murray
BY Day, Oberlin & Day
ATTORNEYS.

Oct. 13, 1925.
J. C. MURRAY
1,556,868
CONVERTIBLE ROLL FILM CAMERA
Filed Dec. 18, 1919  2 Sheets-Sheet 2
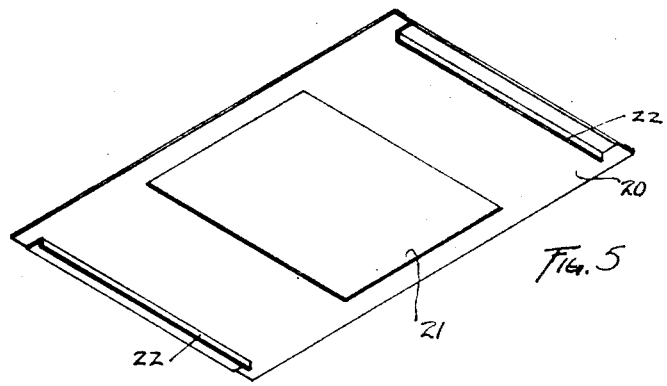
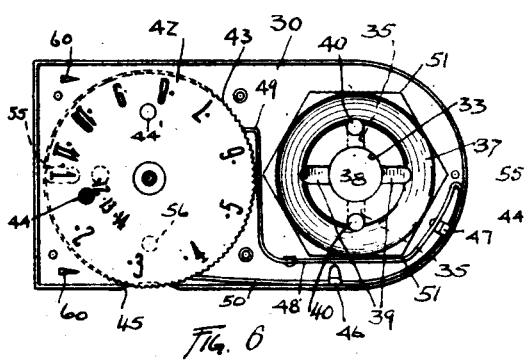
INVENTOR
John C. Murray.
By Day, Oberlin + Day
ATTORNEYS.

Patented Oct. 13, 1925.

1,556,868

UNITED STATES PATENT OFFICE.

JOHN C. MURRAY, OF LAKEWOOD, OHIO, ASSIGNOR TO THE BURDETTE-MURRAY COMPANY, OF CLEVELAND, OHIO, A CORPORATION OF OHIO.

CONVERTIBLE ROLL-FILM CAMERA.

Application filed December 18, 1919. Serial No. 345,812.

*To all whom it may concern:*

Be it known that I, JOHN C. MURRAY, a citizen of the United States, and a resident of Lakewood, county of Cuyahoga and State of Ohio, have invented a new and useful Improvement in Convertible Roll-Film Cameras, of which the following is a specification, the principle of the invention being herein explained and the best mode in which I have contemplated applying that principle, so as to distinguish it from other inventions.

The present invention, relating, as indicated, to a convertible roll film camera, is directed particularly to certain improvements in mechanism which may be readily attached to the standard roll film camera for the purpose of permitting the taking of partial size pictures on a full size film, with the consequent reduction in the operating cost of the camera. Other objects of the invention are the provision in such a device of improvements for allowing the operator to accurately position the various films in front of the lens by the use of the standard winding mechanism, which is already built into the camera. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1:
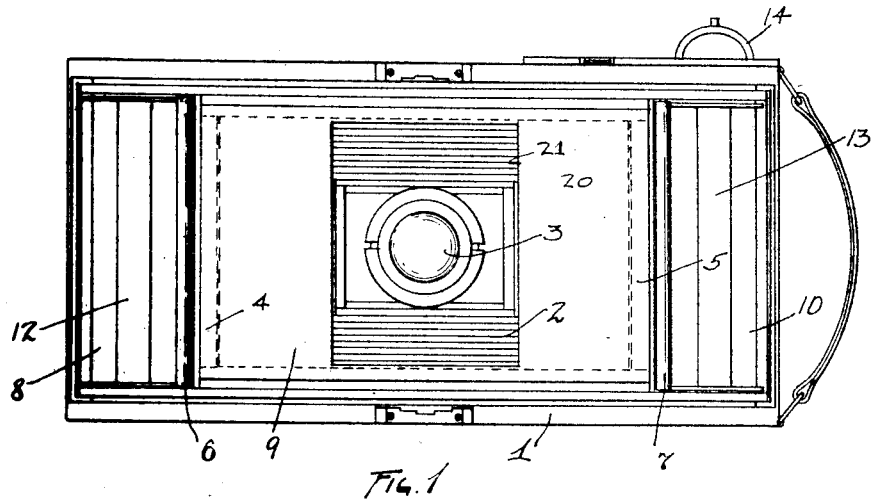
Figure 2:
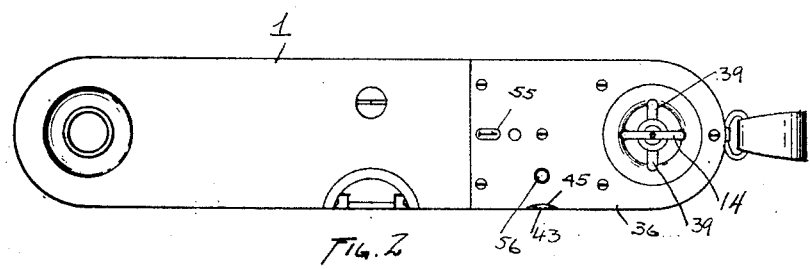
Figure 3:
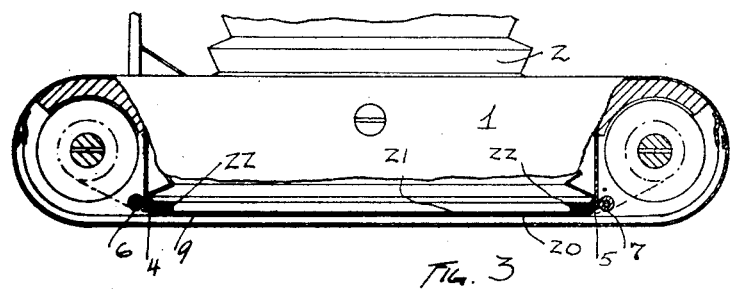
Figure 4:
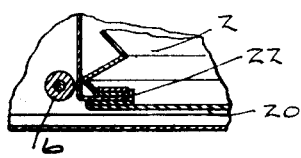

Fig. 1 is a view of the back of the camera with the back or cover removed; Fig. 2 is a side elevation of the same; Fig. 3 is an elevation of the other side of the camera, showing the same partially in section; Fig. 4 is a section on an enlarged scale showing one end of the film mask; Fig. 5 is a view in perspective of such mask; Fig. 6 is a view with the cover plate removed of my improved attachment for operating the winding key; Fig. 7 is a similar view, but showing the mechanism in a different operative position; Fig. 8 is a partial central longitudinal section through the camera and attachment for the winding key; and Fig. 9 is a partial view similar to Figs. 6 and 7, but showing the mechanism in still another operative position.

The operation of the standard size roll film camera is expensive, due to the cost of the films of the proper size, and to the development thereof, while in many cases it is not necessary to take as large pictures as must be taken with the ordinary standard size camera. Various devices have been suggested for effecting a reduction in the size of the pictures to be taken in standard cameras by means of the use of film masks and additional film-rolling devices, which must, however, in all of the devices now on the market, either be built into the camera, or added as more or less permanent attachments. Obviously attachments which have to be permanently added to the camera, or attachments which require any change in the carcass of the camera are ones which the ordinary user cannot, or will not, make for himself, and also are changes which the average user does not like to have made in his camera for fear of damaging it.

The advantages, however, of such a mechanism, if it can be attached without injuring the camera and can be removed readily when desired, are very great, and the present invention consists in means for accomplishing this purpose, which can be readily and almost instantly removed from the camera, and which require no changes or damage to the carcass of the camera when in use.

In Fig. 1 I have shown a rear elevation with the cover or back removed, of a standard camera, in which the carcass or box of the camera is indicated at 1, and contains the usual bellows 2 and lens 3. The construction of the camera proper need not be described in detail, as it does not affect the present invention, and as the camera which I have shown is one which is in common use, and is of standard construction. Mounted at either side of the plates in which the bellows is received are projections 4 and 5, while rollers 6 and 7 for carrying the film across the bellows are mounted on the outer side of these two projections. In this way the camera is divided into three chambers 8, 9 and 10, the chambers 8 and 10 receiving the film mandrels or spools 12 and 13, respectively. The usual spool of film is inserted in a chamber 8. The film is then carried across over the rollers 6 and 7 and attached to the spool 13 in the chamber 10. The spool 13 is operated, that is, it is rotated to wind up the film by means of a winding key 14 of the usual construction, which extends through the upper side of the camera and is shown in its operative position in Fig. 1.

My improved attachment includes, as one element, a film mask adapted to extend across the back of the camera in front of the film, and between the film and the lens, and thus reduce the amount of film which is exposed at one time. The device for this purpose consists of a mask 20 formed of light sheet metal or other material, which has a central opening 21 of a size equal to the amount of film which it is desired to expose at once. My mask acts to allow exposure of the full width of the film, but not the usual length. The plate 20 is provided with two outwardly extending flanges 22, which are adapted to be inserted and held in the inner sides of the two projections 4 and 5 which serve to hold the mask in the desired position. After the film has been drawn across the back of the mask the cover of the camera holds the film and mask in this relation and it is impossible for the mask to slip out of position so long as the cover is on the camera, or so long as the film extends behind the mask.

The other portion of my device consists of means which co-operate with the standard winding key for indicating to the user when the different films have been properly positioned in front of the lenses. This improved means is shown in Figs. 6, 7, 8 and 9 and consists of a plate 30, which is adapted to be set against the upper side of the camera adjacent to the winding key. This plate 30 is of metal and is provided with a cup-shaped portion 31 adapted to fit snugly into the cup-shaped depression which surrounds the winding key. The circular bottom 32 of this depressed portion of the plate 30 is provided with a circular aperture 33 therein adapted to fit over the stem or shaft 34 which is operated by the winding key 14, and is also provided with two oppositely positioned extending recesses 35 which are of a size adapting them to fit snugly over the opposite sides of the winding key 14 when the plate is first positioned on a camera. Mounted above the plate 30 is a second or cover plate 36 arranged in a spaced relation with the plate 30 and adapted to receive therebetween a cup-shaped disc 37 which is rotatably mounted in the recessed or cup-shaped portion of the lower plate 30. This cup-shaped member 37 is provided with a central opening 38 registering with the opening 33 in the plate 32, and has also two extensions 39 from this central opening which may be turned to register with the extensions or recesses 35 in the lower plate 32. By bringing the recesses 39 and 35 into registration, and by bringing the winding key into a transverse position on the camera the plate 30 may be slipped over the winding key. This permits of the attachment being placed against the upper side of the camera over the winding key, after which the winding key may be lifted and turned through a quarter of a turn until the two sides of the handle of the winding key are received in circular pockets 40 formed in the plate 37. There is sufficient spring tension on the winding key tending to draw it forward to hold it in these pockets and to thus give it an operative engagement with the plate 37. The plate 37 is rotatable about the same axis as the winding key between the plates 30 and 36, and this plate 37 is hexagonal in form. The plate 30 is held in position on the camera casing by its engagement with the winding key. It also carries one or more engaging lugs 60 adapted to be pressed into the casing to prevent accidental removal. When built into a camera this plate 30 may be fastened to the casing in any suitable manner, and will preferably be inset to bring it to the normal level of the back of the camera.

As shown in Figs. 6 and 7, also mounted between the plates 30 and 36, is a disc 42 provided with notched edges 43 and bearing numbers which are shown in Figs. 6 and 7 at various points around its circumference. This disc also carries variously colored marks 44 and 44', for purposes to be described hereinafter, while the teeth 43 extend through a notch 45 formed in the edge of both of the plates 30 and 36. Mounted in suitable lugs 46 and 47 on the plate 30 is a spring member, of which one arm 48 is formed as indicated, and provided with a right-angled end 49 adapted to engage against the teeth 43 of the disc. The other arm 50 of the spring is engaged against the edge of the teeth 43 in such a way as to prevent the disc 42 from rotation in a counter-clockwise direction. The arm 48 of the spring lies adjacent to the hexagonal disc 37 and the various points or corners 51 of this hexagonal disc are adapted, upon its rotation, to contact against this arm 48 and to depress the spring when looking at the same as in Fig. 7, which causes the end 49 of this arm to turn the disc in a clockwise direction. As soon as each point 51 of the disc 37 has passed, and the hexagon is again lying in the position shown in Fig. 6, the spring arm 48 snaps back into the position shown in this figure, so that continued operation of the disc 37 causes a step-by-step rotation of the disc 42, which may be stopped at any desired point, as there is sufficient pressure between the discs 30, 37 and 36 to hold the disc 36 against accidental movement.

The chief advantage of my improvement is that it enables a large camera to be operated to take small pictures which are much clearer than the same size pictures taken on a smaller size camera because of the superiority of construction of the larger sizes of cameras. The construction of my invention is such that it may be attached without injury to the camera, and without the aid of tools. Finally, it may be removed with the same facility as it can be attached so that the camera may at any time be used to take normal size pictures.

When a film is inserted in a camera and attached to the winding spool for use the winding key 14 is turned in the usual manner until the indicating hand, which is marked on the film appears before the window in the back of the camera. The disc 42 is then turned by pressure upon the teeth projecting through the slot 45 until the dot 44 appears before the opening 56 in the plate 36. This movement of the disc 42 is without effect upon the winding key, the teeth of the disc merely slipping beneath the spring 49. When the disc is so positioned the winding key may then be used to bring the first film into position for exposure, this position being indicated of course by the appearance of the numeral 1 before the slot 55 in the cover plate 36, while successive film exposure positions are similarly indicated by the other numerals 2, 3, 4, 5, 6, etc.

While the present device is shown as adapted to a standard six exposure film, which will give twelve half exposures, it is equally well suited to large 10 or 12 exposure films, which will give 20 or 24 half exposures. The arrangement of numerals on the disc 42 and the operating ratio between the disc and the winding key must be varied, but this can be readily done without departing from the principles of the invention.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a device of the character described, the combination of a member adapted to be mounted upon the winding key of a camera, and means carried by said member and adapted to indicate automatically successive film exposure positions upon operation of said winding key.

2. In a device of the character described, the combination of a member adapted to engage over the winding key of a camera, and means carried on said member, said means being actuated by rotation of said winding key and being adapted to indicate successive film exposure positions upon operation of said winding key.

3. In a device of the character described, the combination of a plate adapted to be mounted upon the side of a camera adjacent to the winding key thereof, means on said plate adapted to engage over said winding key upon such positioning of said plate, and other means operable upon rotation of said winding key, said means being adapted to indicate successive film exposure positions upon operation of said winding key.

4. In a device of the character described, the combination of a plate adapted to be mounted upon the side of a camera adjacent to the winding key thereof, said plate being also adapted to engage over said winding key when so positioned, and means mounted on said plate and adapted to be engaged with said winding key, said means being adapted to indicate successive film exposure positions upon operation of said winding key.

5. In a device of the character described, the combination of a member adapted to be removably mounted on the side of a camera and thereupon removably engaged with the winding key thereof, a second member mounted on said first-named member and adapted to be operatively locked to said winding key, and means carried on said first-named member, said means being adapted to indicate successive film exposure positions upon rotation of said winding key.

6. The combination of a rotatable disk, a polygonal member rotatably mounted adjacent and parallel to said disk, and a member actuated by the corners of said member upon rotation thereof, said last-named member being adapted to engage and turn said disk when so actuated.

7. The combination of a rotatable disk, a polygonal member rotatably mounted adjacent and parallel to said disk, a resilient member disposed adjacent said polygonal member and in the path of movement of the corners thereof, said resilient member normally engaging said disk and being adapted to turn said disk upon being displaced by said polygonal member.

8. The combination of a rotatable disk, a polygonal member rotatably mounted adjacent and parallel to said disk, a resilient member disposed adjacent said polygonal member and in the path of movement of the corners thereof, said resilient member normally engaging said disk and being adapted to turn said disk upon being displaced by said polygonal member, and said resilient member having an arm engaging said disk and preventing movement except in one direction.

Signed by me, this 19" day of December, 1919.

JOHN C. MURRAY.